(12) United States Patent
Kalinin et al.

(10) Patent No.: US 8,296,087 B2
(45) Date of Patent: Oct. 23, 2012

(54) INTERROGATION METHOD FOR PASSIVE WIRELESS SENSOR INTERROGATION SYSTEM

(75) Inventors: Victor Alexandrovich Kalinin, Oxford (GB); John Peter Beckley, Oxon (GB); Bryn James Dixon, Milton Keynes (GB)

(73) Assignee: Transense Technologies plc, Bicester, Oxon (GB)

( * ) Notice: Subject to any disclaimer, the term of this patent is extended or adjusted under 35 U.S.C. 154(b) by 283 days.

(21) Appl. No.: 12/728,620

(22) Filed: Mar. 22, 2010

(65) Prior Publication Data
US 2010/0250170 A1    Sep. 30, 2010

(30) Foreign Application Priority Data

Mar. 25, 2009    (GB) .................................. 0905192.1

(51) Int. Cl.
*G01R 23/16*    (2006.01)

(52) U.S. Cl. ................. 702/76; 702/75; 702/77

(58) Field of Classification Search .......... 702/57, 702/75, 76, 77, 101, 104, 116, 129, 173, 702/179, 182, 183, 188, 199
See application file for complete search history.

(56) References Cited

U.S. PATENT DOCUMENTS

| | | | |
|---|---|---|---|
| 7,065,459 B2* | 6/2006 | Kalinin et al. | 702/77 |
| 7,862,510 B2* | 1/2011 | Luo et al. | 600/438 |
| 2009/0100036 A1* | 4/2009 | Bedrax-Weiss et al. | 707/5 |

FOREIGN PATENT DOCUMENTS

| | | | |
|---|---|---|---|
| GB | 2381074 | | 4/2003 |
| GB | 2411239 | | 8/2005 |
| GB | 2411239 A | * | 8/2005 |

OTHER PUBLICATIONS

Dixon et al.; A Second Generation In-Car Tire Pressure Monitoring System Based on Wireless Passive SAW Sensors; Proc of 2006 IEEE Int Freq. Control Symposium; Jun. 5-7, 2006; Miami,FL; 7 pages.

* cited by examiner

*Primary Examiner* — Michael Nghiem
*Assistant Examiner* — Yaritza H Perez Bermudez
(74) *Attorney, Agent, or Firm* — Keusey & Associates, P.C.

(57) ABSTRACT

A method of wirelessly interrogating a sensing device comprising a plurality of passive sensors, to determine a measurement parameter, comprises the steps of repeatedly interrogating the sensing device using a predetermined transmission signal and detecting the response; estimating the measurement parameter for each sensor by means of an analysis of the data accumulated as a result of the interrogation step, and determining the average of the parameters derived from the estimating step for each sensor, using a weighted average, in which the weightings depend on the amplitude of the sensor response. The measurement parameter may be a resonant frequency where the passive sensors are resonant devices, and the sensors may be SAW devices.

24 Claims, 2 Drawing Sheets

INTERROGATION METHOD FOR PASSIVE WIRELESS SENSOR INTERROGATION SYSTEM

BACKGROUND OF THE INVENTION

1. Field of the Invention

This invention relates to a method for interrogating sensor systems based on wirelessly interrogated passive sensor-transponders as used, for example, for measuring pressure and temperature of air in vehicle tires. More specifically, a preferred embodiment of the invention provides a passive sensor interrogation algorithm which allows high accuracy of measurement of pressure and temperature.

2. The Prior Art

Passive wireless sensors based on resonators have been under development for the last 10 years. They offer a cost-effective batteryless solution for the applications where physical quantities such as temperature, pressure, acceleration, torque etc. need to be measured to be pleasured on rotating or moving parts. If surface acoustic wave (SAW) resonators are employed as sensing elements then their working frequency within the UHF range makes the antenna size (of around 10 cm) suitable for a wide range of practical applications. At the same time a very high Q factor of the SAW resonators around 10000 makes it possible to measure their resonant frequency wirelessly with a good accuracy.

The basic principle behind the SAW resonant sensors is that the resonant frequency depends on the physical quantities mentioned above. Usually the SAW sensing element is designed in such a way that it contains several SAW resonators, each characterised by a different variation of the resonant frequency with temperature, torque. and pressure etc, in other words, different calibration characteristics. The physical quantities are found by measuring wirelessly the resonant frequencies of all the resonators connected to a single sensor antenna and a subsequent solution of simultaneous equations approximating the sensor calibration characteristics.

Figure 1:
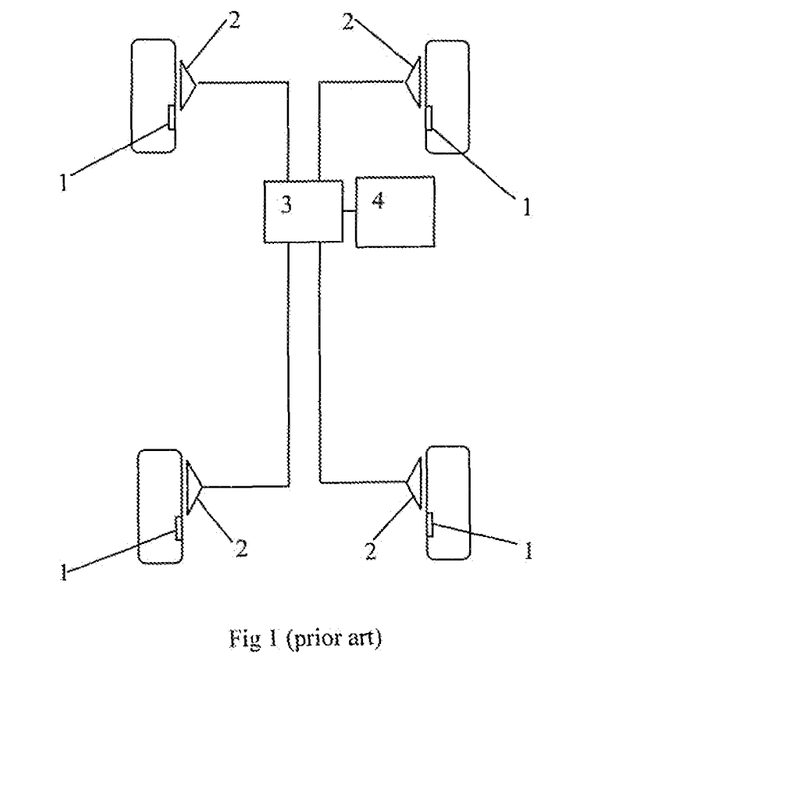
FIG. 1 illustrates schematically a known tire pressure and temperature monitoring system in a vehicle.

One application of the passive wireless resonant sensors in the car tire pressure and temperature monitoring system (TPMS) is described in the paper by B. Dixon, V. Kalinin, J. Beckley and R. Lohr "A second generation in-car tire pressure monitoring system based on wireless passive SAW sensors", Proceedings of 2006 IEEE Frequency Control Symposium. As shown in FIG. 1, the system consists of four SAW sensors 1 (each equipped with its own antenna) installed inside the tires, four interrogation antennas 2 installed under the wheel arches and connected in turn by the RF switch 3 to the input of the interrogation unit 4. The SAW sensing element 1 in this case consists of three SAW resonators with the resonant frequencies occupying a license-free 433 MHz ISM (Industrial, Scientific and Medical) frequency band. By measuring wirelessly the three resonant frequencies one after another the interrogator can determine independently both pressure and temperature inside the tire (one of the resonators is used as a reference to allow differential measurement to minimize influence of parasitic effects such as aging and frequency pulling by a variable antenna impedance).

Wireless measurement of the resonant frequency is adversely affected by two phenomena—noise in the electronic circuits of the interrogator's receiver and RF interference picked up by the interrogation antenna. The noise causes random errors in the measured resonant frequency that may become unacceptably large when the magnitude of the SAW response picked up by the receiver is small (it happens in TPMS at certain angular positions of the wheels). The RF interference may come from another system working in the 433 MHz ISM band such as a remote keyless entry system (RKE) or from the TPMS transmitter of a neighbouring vehicle. It may block the interrogator's receiver and make interrogation impossible. The same problems can also arise in sensing systems for wireless measurement of not only frequency but also phase and group delays (e.g. in delay line sensor systems), modulation depth or other signal parameters. The aim of this application is to disclose an interrogation method that allows improving noise and interference immunity of the wireless interrogator of the passive sensing system.

The resonant frequency can be measured wirelessly by a number of different methods. The method most suitable for the distance of around 1-3 m has been disclosed in the GB patent 2381074 (and corresponding patent U.S. Pat. No. 7,065,459) and GB patent 2411239. The interrogation is performed in the time domain by launching an RF interrogation pulse at the interrogation frequency close to the resonant frequency of the SAW resonator that is being measured, exciting natural oscillation in the resonator, then picking up the natural oscillation after the interrogation pulse is over and analysing its spectrum. The frequency of the natural oscillation corresponding to the maximum of the power spectral density (PSD) is assumed to be equal to the measured resonant frequency.

The interrogator contains a pulsed transmitter (Tx) generating the interrogation pulses at one of the number of possible discrete interrogation frequencies. The pulse width is such that it can efficiently excite the natural oscillations, i.e. it is related to the loaded Q factor of the resonator+the sensor antenna connected to it. In practice it is of the order of 10 μs. The shape of the pulse envelope and its peak power are such that its spectrum complies with the regulations of the country where the sensing system is used. For instance, the envelope can have rise and fall modulated by a Gaussian function to suppress spectrum sidelobes and the peak power should be below 10 dBm in EU countries. The frequency interval between possible interrogation frequencies is also related to the loaded Q factor of the resonator and it is in the range between 25 and 100 kHz at 433 MHz. This arrangement always allows finding such an interrogation frequency that the natural oscillation can be efficiently excited (the spectrum of the interrogation pulse overlaps with the frequency response of the resonator).

The interrogator also contains a wideband superheterodyne receiver (Rx) picking up the natural oscillation after the interrogation pulse is over. The receiver converts the input frequency to an intermediate frequency (IF) that can be easily sampled by an analog-to-digital converter (ADC) but it should be larger than the spectral width occupied by the SAW response. For instance, the nominal IF (the one at the IF output when the input frequency equals the interrogation frequency) can be around 1 MHz. Knowing the frequency of the IF signal, one also knows the frequency of the RF signal at the Rx input. The Rx bandwidth should be wide enough in order to prevent transient processes at the Rx output from corrupting the SAW response. In practice it can be from 1.5 to 5 MHz. The abovementioned documents disclose the use of two IF outputs of the receiver, I(t) and Q(t), shifted relative to each other in phase by 90°. They can be obtained, for instance, by using a quadrature mixer in the Rx frequency down-converter.

The SAW responses I(t) and Q(t) at the IF are sampled by the ADC (samples are taken at the same moments of time both for I and Q channels) during a period of 10 to 20 μs, corresponding to the length of the exponentially decaying SAW response. Then a digital signal processor (DSP) performs a spectral analysis of the signals I(t) and Q(t) and finds precise positions of the maximum of the power spectral density of each signal using parabolic (or any other) interpolation between the calculated spectral lines. The frequencies corresponding to those positions are averaged to give the frequency of the natural oscillation. This method of calculation drastically reduces influence of the unknown initial phase angle of the SAW response on the measured frequency and thus improves the accuracy of the measurement. The alternative approach giving the same high precision is to calculate the power spectral density of the complex signal I(t)+jQ(t) and find the frequency of the natural oscillation as the one corresponding to the maximum of this PSI), again, by using interpolation. It requires fewer calculations in comparison with the previous approach.

The abovementioned documents disclose a general structure of the interrogation algorithm. Interrogation begins with the search phase when the interrogation unit sweeps through all possible interrogation frequencies and finds the ones closest to the resonant frequencies of all three resonators. The documents describe possible ways of finding those optimal interrogation frequencies based on the analysis of the maxima of the calculated PSD values. After the search is complete the measurement phase begins when the resonant frequencies are measured sequentially one after another with high precision. At the measurement phase the interrogation is performed either at the optimum interrogation frequency found during the search or at the interrogation frequency closest to the previously measured resonant frequency (if the measurement is not triggered manually but repeated automatically).

These documents also suggest a number of measures to improve noise and interference immunity of the interrogation unit.

A. Noise

The first measure is to use coherent accumulation of several SAW responses. This is achieved by repeated launching of the interrogation pulses at the same frequency and adding sampled values of I(t) and Q(t) to the values obtained for the previously received SAW response in the DSP buffers. The samples should always be taken at the moments tied to the initial phase angle of the SAW responses to preserve coherency. This can be achieved if the same clock oscillator is used to generate the local oscillator signal in the Rx and the clock frequency in the DSP. Other conditions are disclosed in U.S. Pat. No. 7,065,459. Coherent accumulation of $N_c$ SAW responses improves signal-to-noise ratio by a factor of $N_c^{1/2}$. Influence of the phase noise of the local oscillator is also reduced by the same factor. In practice, $N_c$ is typically 5 to 30.

The second measure is to average several measurement results for each resonant frequency. Averaging $N_a$ frequency readings accumulated in the DSP buffer reduces random errors of the measured frequency by a factor of $N_a^{1/2}$ where, in practice, $N_a$=10 . . . 100. In other words, if σ is the standard deviation of the individual resonant frequency readings $f_j$ then the averaged frequency $$f_{ave} = \frac{1}{N_a} \sum_{j=1}^{N_a} f_j \quad (1)$$

will have the standard deviation $$\sigma_{f_{ave}} = \sigma/\sqrt{N_a}. \quad (2)$$

Figure 2:
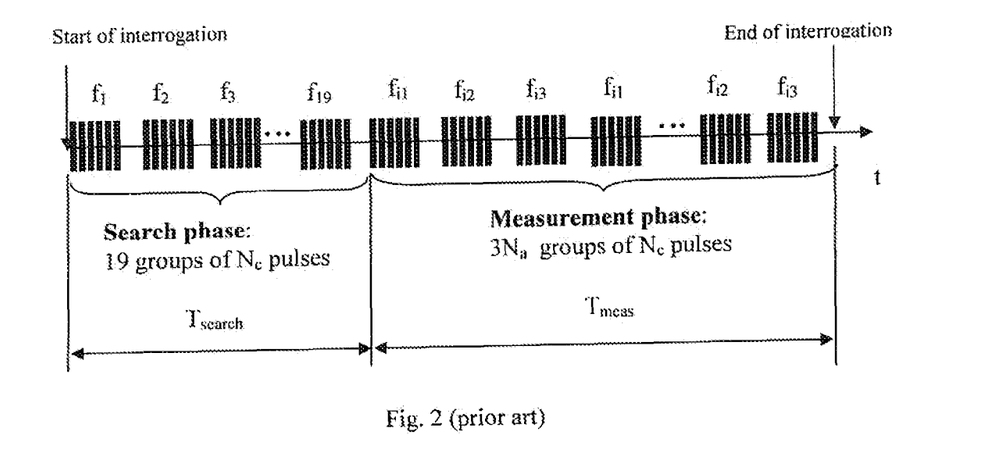
FIG. 2 shows an example timing diagram for sensor interrogation pulses in a known sensing system.

An example of the timing diagram for the interrogation pulses radiated by the Tx is shown in FIG. 2. Interrogation begins with the search phase when 19 possible interrogation frequencies are swept. Groups of $N_c$=6 are launched at each frequency in order to accumulate $N_c$ SAW responses. The distance between the groups is determined by the time needed for the spectral analysis and frequency calculation as well as switching of the Tx to another interrogation frequency. The measurement phase consists of three groups of pulses at the optimal interrogation frequencies $f_{i1}, f_{i2}, f_{i3}$ repeated $N_a$ times in order to fill in the three buffers of the measured resonant frequencies $f_{1,2,3}$. The average frequencies can be calculated at the end of those $3N_a$ groups if the measurement needs to be performed once, or the cycle can be repeated if the average frequency readings need to be periodically updated. Average frequencies can also be calculated as moving averages.

The problem with this approach is that the amplitudes of the SAW responses are usually not constant; for example, in the case of TPMS, they vary as a result of rotation of the wheels and thus variation of the distance between the interrogation antenna and the sensor antenna as well as variation of the sensor antenna impedance. For certain positions the amplitude of the SAW response is so small that the frequency reading obtained by the reader becomes unreliable. According to the method proposed in the abovementioned documents these readings need to be disregarded, i.e. excluded from calculation of the average frequency in Eq. (1). As a result, the number of the groups of interrogation pulses needed to all in the averaging buffers can be larger than $3N_a$ by perhaps 25% to 50%. This increases the minimum achievable data update period. In practical TPMS, filling in the buffers can take up to 300 . . . 500 ms for $N_a$=40. As a result, temperature and pressure cannot be updated faster than 1.2 . . . 2 s in the case of the measurement performed in four wheels. For some applications, in particular in motor sport, this update period is too large. One aim of the invention is to provide a method that can either reduce random errors of the wireless resonant frequency measurement for a fixed update period or reduce the update period for a given standard deviation of the random errors.

B. Interference

Broadband interference has the same effect on the measurement as noise. Narrowband interference is more dangerous because it may completely spoil the measurement results or cause an unacceptably large systematic error if its frequency is within approximately ±100 kHz around the measured resonant frequency and the amplitude is above a certain threshold level (for instance 20 dB below a typical SAW response amplitude). The abovementioned documents adopt the strategy similar to the one used in CSMA-CD (Carrier-Sense Multiple Assess with Collision Detection) communication protocols. Before launching the interrogation pulse at the beginning of coherent accumulations, the interrogator's receiver "listens" to the interference by taking samples of the IF signal. If interference is detected, the measurement is delayed by a random interval of time. Since the interference needs to be detected only within a limited frequency range of about 200 kHz, much smaller than the Rx bandwidth, detection of the narrowband interference cannot be performed by a simple measurement of the rms or peak value of the IF signal as it is usually done in communication systems. Instead, it is proposed to calculate PSD values of the IF signal within the frequency range of interest and compare the maximum PSD value with the threshold. Detection of interference within the limited bandwidth allows increasing capacity of the system by a factor of three (in the case where there are three SAW resonators in the sensor) because it makes possible simultaneous interrogation of three resonators by three different systems.

Figure 3:
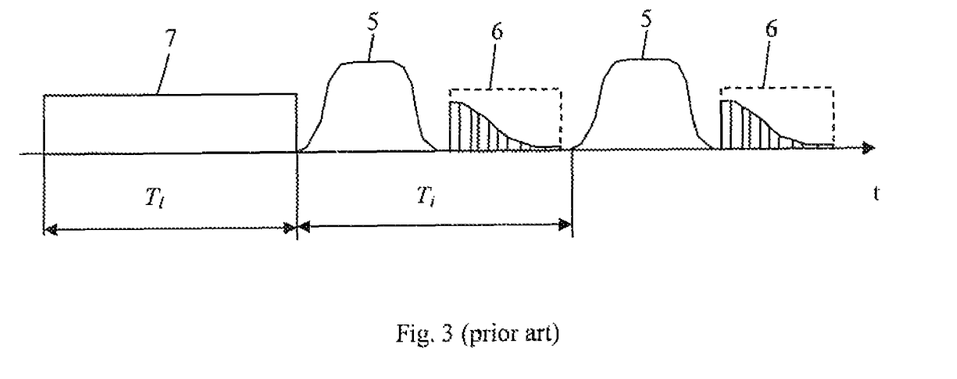
FIG. 3 shows a timing diagram illustrating in interference detection window in a known sensing system.

The abovementioned documents do not disclose how long the Rx should "listen" to the interference. If a source of interference uses the ISM band for a slow digital data transmission by means of frequency-shift keying (FSK) signals or analogue transmission by means of AM or FM signals then the period of "listening" is not critical, it can be quite short—the interference will not be missed. A more dangerous situation is when the interference is generated by a neighbouring TPMS system of the same type installed on another vehicle. In this case the "listening" period $T_l$ should be as long as the period $T_i$ of the interrogation pulses which is approximately from 20 to 40 μs. It is determined by the length of the interrogation pulse 5 and the length of the SAW response sampling window 6 as shown in FIG. 3. Only in this case will the interference sampling window 7 intercept the whole single interrogation pulse and correctly determine its maximum PSD.

The problem with this approach is that the number of interference samples in this case will exceed the number of the signal samples (the sampling period in both windows should be the same to be able to use the same sine and cosine look-up table and the same routine for calculation of the PSD in the DSP). As a result, the size of the sine and cosine look up table stored in the DSP memory has to be significantly increased, which may pose a problem for inexpensive DSP chips used in the SAW interrogation units. Another aim of the invention is to provide a method of improving robustness of the interference detection and reducing the required number of interference samples.

SUMMARY OF THE INVENTION

As explained above, the method according to the invention addresses two main issues:
1. Improvement of the frequency averaging procedure to reduce the amount of random frequency measurement errors caused by noise or to reduce the time required for the averaging.
2. Improvement of the interference detection method to increase its robustness and reduce the amount of required DSP memory.

However, it should also be noted that the invention is applicable equally to measurement parameters other than resonant frequency, depending on the type of passive sensor being employed in a particular system.

The present invention provides a method of wirelessly interrogating a sensing device comprising a plurality of passive sensors, to determine a measurement parameter, f. The method includes steps of repeatedly interrogating the sensing device using a predetermined transmission signal and detecting the response; estimating the measurement parameter for each sensor by means of an analysis of the data accumulated in the interrogating step; and determining the average of the parameters derived from the estimating step for each sensor, using a weighted average, in which the weightings depend on the amplitude of the sensor response.

The weightings depend on the maximum power spectral density of the sensor response. The averaged measurement parameter $f_{ave}$ is given by $$f_{ave} = \frac{\sum_{j=1}^{N} w_j f_j}{\sum_{j=1}^{N} w_j},$$

where $f_j$ is an individual reading from a sensor, $w_j$ is the weight assigned to the reading $f_j$, and N is the number of readings being averaged. The weightings $w_j$ are selected so as to minimise the standard deviation of $f_{ave}$ for a given value of N. The weightings $w_j$ are selected according to the rule $w_j = S/\sigma_j^2$, where S is a constant, and $\sigma_j$ is the standard deviation of the measured parameter.

The measured parameters are stored in an averaging buffer, and the weightings $w_j$ are selected so as to minimise the time needed to fill the buffer while maintaining the standard deviation of the averaged measurement parameter. The weightings are integer weightings where $w_j \geq 1$, and each measured value $f_j$ is written into the buffer $w_j$ times.

The range of power spectral density values of the sensor responses is divided into K classes, and the weightings for measurement parameter values in each class are selected by minimising the goal function $$G = F_1(\sigma_{f\,ave}) + CF_2(\langle N \rangle / N_a),$$

where $F_1(x)$ and $F_2(x)$ are monotonously increasing functions, C is a constant and the variance $\sigma^2_{f\,ave}$ of the averaged measurement parameter is given by $$\sigma^2_{f ave} = \frac{1}{N_a} \frac{\sum_{m=1}^{K} w_m^2 \sigma_m^2 p_m}{\sum_{m=1}^{K} w_m p_m},$$

where $w_m$ is the weighting for each of the K classes, $\sigma_m$, is its standard deviation and $p_m$ is the probability of a reading belonging to the class, $N_a$ is the length of the averaging buffer and $\langle N \rangle$ is the average number of readings required to fill in the buffer, given by $$\langle N \rangle = \frac{N_a}{\sum_{m=1}^{K} w_m p_m}.$$

The parameters governing the K classes are determined from test measurements performed for a given system of sensors. The weightings are selected using a genetic optimisation algorithm.

The interrogation of the sensing device in the interrogating step includes an interrogation period during which an interrogation pulse is transmitted, followed by a device sampling period for receiving the response from the device. An interference detection step, may be provided which includes detecting an interference signal in the absence of an interrogation pulse, during a detection window immediately preceding an interrogation period. Then the power spectral density of the interference signal is compared with a predetermined threshold level. The detection window substantially corresponds to the length of the interrogation pulse plus the device sampling period, and includes two discrete interference sampling periods during which respective interference signals are detected. The interference sampling periods are equal in length, and are located respectively at the beginning and end of the detection window. The length of the interference sampling periods does not exceed the length of the device sampling period. The length of the interference sampling periods corresponds to a substantial portion of the length of the interrogation pulse.

The maximum power spectral densities of the interference signals detected in each interference sampling period are combined to determine a combined power spectral density value. The combined power spectral density P is determined by:

$P=(P_1^{1/2}+P_2^{1/2})^2$, where $P_1$ and $P_2$ are the respective maximum power spectral density values for the two interference sampling periods. The combined power spectral density P is determined by; $P=P_1+P_2$. If the combined power spectral density exceeds a predetermined threshold level, the interrogation period is delayed or a different device or sensor is selected for interrogation.

A second pair of interference sampling periods are located at the end of the repeated interrogation cycle to detect interference emerging during the interrogation cycle. The determined measurement parameters are used to calculate pressure and temperature. The passive sensors are SAW devices. The sensing device comprises a plurality of resonant devices, and the measurement parameter is the respective resonant frequency of each resonant device. The resonant frequencies are estimated by means of spectral analysis of the data accumulated as a result of the interrogation step.

Prior to the interrogation step, the method may include the step of determining an optimal interrogation frequency for each resonant device, by interrogating each resonant device a plurality of times at its determined respective optimal interrogation frequency. The spectral analysis in the determining step includes performing discrete Fourier transforms, or is based on parametric signal modelling.

BRIEF DESCRIPTION OF THE DRAWINGS

The advantages, nature and various additional features of the invention will appear more fully upon consideration of the illustrative embodiments now to be described with reference to the accompanying drawings, in which.

DETAILED DESCRIPTION OF THE PREFERRED EMBODIMENT

1. Improved Averaging Method

A traditional averaging is shown in Eq. (1) for a measurement parameter f, which, in the described embodiment, is the resonant frequency of a resonant device. This traditional averaging is based on the assumption that the standard deviation $\sigma$ of the individual measurement does not vary with time so it is the same for all readings. Where the resonant frequency is measured wirelessly in a dynamic environment this is not true any more. The amplitudes of the received SAW responses are all different and hence signal-to-noise ratios are also different. As a result each individual frequency reading $f_j$ has to be characterised by its own standard deviation $\sigma_j$ depending on the signal-to-noise ratio. The readings $f_j$ obtained from the SAW responses with higher maximum PSD values $P_j$ are more reliable and are characterised by a smaller value of $\sigma_j$.

It is proposed to use a weighted average $$f_{ave} = \frac{\sum_{j=1}^{N} w_j f_j}{\sum_{j=1}^{N} w_j} \quad (3)$$

instead of the simple average (1) to estimate the value of the wirelessly measured resonant frequency. Here is the weight assigned to the reading $f_j$ and N is the number of different readings taking part in the averaging process. Since the readings $f_j$ corresponding to higher $P_j$ values are more reliable they should be assigned a larger weight $w_j$. The interrogation unit measures not only $f_j$ but also $P_j$ anyway so all the information required for selection of the weights is available in the DSP.

Selection of the optimum weights $w_j$ can be performed in a number of possible ways. One possible way is to fix the number of valid readings N for each measured resonant frequency and select the weights in such a way that they minimize the standard deviation of the measured averaged frequency $f_{ave}$ calculated according to Eq. (3). One can show that the weights selected according to the following rule $$w_j = S/\sigma_j^2 \quad (4)$$

minimize the standard deviation of $f_{ave}$ (see Appendix I). The constant S can have any value. In order to implement the rule (4) in a particular wireless measurement system one should establish first the relationship between the standard deviation $\sigma_j$ of the measured frequency and the amplitude of the maximum PSD value of the SAW response $P_j$, which can be done experimentally.

Another possible way of selecting the optimum weights $w_j$ is to fix the length of the averaging buffer $N_a$ and select the weights in such a way that they minimize the time needed to fill in this buffer, keeping the same value of the standard deviation of the measured averaged frequency. This method allows minimization of the data update period. A version of this method with integer weights $w_j \geq 1$ is especially attractive because it greatly simplifies calculation of Eq. (3), since multiplication by $w_j$ can be replaced by writing the frequency value into the buffer $w_j$ times. Obviously, in this case $$N_a = \sum_{j=1}^{N} w_j \quad (5)$$

and the required number of valid readings N needed to fill in the buffer becomes random. Its average value $$\langle N \rangle = \frac{N_a}{w_{ave}} \quad (6)$$

can be considerably smaller than $N_a$ leading to a reduction of the measurement time and the data update period (see Appendix II) since the average weight $w_{ave}$ exceeds unity. The following method of calculation of the optimal weights can be used in this case.

First, a set of test measurements should be performed for a given wireless measurement system. As a result, one should split the whole range of the PSD values $P_j$ above a threshold into K classes, the m-th class characterised by its standard deviation $\sigma_m$, and the probability $p_m$ of the reading belonging to it. One can show (see Appendix II) that the variance of the averaged frequency is $$\sigma_{fave}^2 = \frac{1}{N_a} \frac{\sum_{m=1}^{K} w_m^2 \sigma_m^2 p_m}{\sum_{m=1}^{K} w_m p_m}. \qquad (7)$$

The optimum weights $w_m$, for each of K classes can be found by minimization of a goal function G based on the standard deviation ($\sigma_{f\,ave}$) of $f_{ave}$, in the following general form:

$$G = F_1(\sigma_{fave}) + CF_2(<N>/N_a) \qquad (8)$$

where $F_1(x)$ and $F_2(x)$ are any monotonously increasing functions and C is a constant.

In the case where $F_1(x)=x^2$ and $F_2(x)=x$, the goal function becomes:

$$G = \sigma_{fave}^2 + C/w_{ave} \qquad (9)$$

such that the $C/w_{ave}$ term is proportional to the time needed to fill in the averaging buffer, and the constant C establishes a relative importance of minimizing the buffer filling time. By varying the value of C one can trade off between the value of $\sigma_{f\,ave}^2$ characterising random measurement errors and the average weight value $$w_{ave} = \sum_{m=1}^{K} w_m p_m \qquad (10)$$

characterising the length of measurements.

As an example, it has been established experimentally that the readings obtained for a wireless TRMS installed on a passenger car can be split into 10 classes according to the amplitude of the SAW response. Standard deviations, probabilities and the optimum weights for those classes are given in the table below in the case if $C=0.02\ \text{kHz}^2$.

The method based on minimization of the goal function (8) is not the only one possible. Another method is based on a genetic optimization algorithm.

In the case of using a genetic algorithm, a computer simulation (based on real world measurements) is used to evaluate the performance of several sets of averaging weights. The simulation produces an estimate of the resulting standard deviation of the measured frequency σ.

During each iteration of the genetic algorithm, a certain number of the best performing sets of weights (children) are allowed to live on into the next iteration (as parents). Randomly mutated versions of these strongest performers are also added to the next generation. Finally, the strongest contenders are also randomly paired, and a random section of their weights crossed over, to create further children.

After this mutation/cross breeding process is complete, the performance of each set of weights (child) is, once again, evaluated using the simulator, and the whole process repeated. Within a relatively short number of iterations (generations), an optimum set of weights is arrived at.

For the data presented here, each generation consisted of 12 sets of weights, and the following goal function similar to Eq. (8) was used to evaluate their performance $$G = W_s \frac{\sigma_{fave}}{\sigma_T} + W_a \frac{N}{N_a} \qquad (11)$$

where $\sigma_T$ is the target standard deviation (i.e that achieved when not using weighted averaging), N is the number of readings when using weighted averaging, and $N_a$ the number of elements required to average when not using weighting. $W_s$ and $W_a$ are constants controlling the trade off between minimizing standard deviation vs. minimizing the number of readings required.

This goal function is a version of the generalised function set out in Eq. (8), in which $F_1(x)=F_2(x)=x$, and $C=\sigma_T W_a/W_s$.

For the measured system here, when 40 readings are averaged using equal weighting, a standard deviation of 90-100 Hz for the SAW resonant frequency is achieved. However, by using the above mentioned genetic algorithm, applying equal bias of $W_s$-0.5 and $W_a$=0.5 to the goal function (11), a set of

|  | Class | | | | | | | | | |
|---|---|---|---|---|---|---|---|---|---|---|
|  | 1 | 2 | 3 | 4 | 5 | 6 | 7 | 8 | 9 | 10 |
| $\sigma_m$, kHz | 1.96 | 1.58 | 1.26 | 0.98 | 0.76 | 0.58 | 0.44 | 0.34 | 0.27 | 0.23 |
| $p_m$ | 0.0203 | 0.0361 | 0.0361 | 0.0406 | 0.0801 | 0.0880 | 0.0993 | 0.2641 | 0.2472 | 0.088 |
| $w_m$ | 1 | 1 | 1 | 1 | 1 | 1 | 2 | 3 | 4 | 6 |

Averaging of the frequency using uniform weights according to Eq. (1) would give the standard deviation $\sigma_{f\,ave}=102$ Hz. Averaging according to Eq. (3) with the weights from the above table gives $\sigma_{f\,ave}=101$ Hz and $w_{ave}=2.8$ which corresponds to reduction of the measurement time by a factor of 2.8.

weights are arrived at after just 13 generations, which result in a standard deviation of SAW frequency measurement of approximately 100 Hz, yet only requires 12 SAW readings, rather than 40 (see Table I). This corresponds to a reduction of the measurement time by a factor of 3.3. These results tally well with those arrived at above using statistical analysis.

TABLE 1 showing key iterations/generations, arriving at optimum weights for minimum, number of readings, while maintaining a standard deviation equivalent to that obtained when averaging 40 un-weighted readings.

| Generation number | Goal error | $\sigma_{f_{ave}}$ (Hz) | Number of readings N | Weights $w_m$ | | | | | | | | | |
|---|---|---|---|---|---|---|---|---|---|---|---|---|---|
| 0 | 0.969 | 93.8 Hz | 40 | 1 | 1 | 1 | 1 | 1 | 1 | 1 | 1 | 1 | 1 |
| 1 | 0.859 | 106.5 Hz | 26 | 1 | 1 | 1 | 1 | 2 | 1 | 2 | 2 | 1 | 1 |
| 2 | 0.727 | 100.4 Hz | 18 | 1 | 1 | 1 | 2 | 1 | 1 | 1 | 1 | 4 | 3 |
| 3 | 0.683 | 96.4 Hz | 16 | 1 | 1 | 1 | 2 | 1 | 1 | 1 | 1 | 4 | 4 |
| 6 | 0.660 | 96.2 Hz | 14 | 1 | 1 | 1 | 1 | 1 | 1 | 1 | 2 | 4 | 4 |
| 13 | 0.658 | 100.7 Hz | 12 | 1 | 1 | 1 | 1 | 1 | 1 | 1 | 2 | 4 | 6 |
| 14 | 0.638 | 96.6 Hz | 12 | 1 | 1 | 1 | 1 | 1 | 1 | 1 | 2 | 4 | 6 |
| 32 | 0.635 | 96.0 Hz | 12 | 1 | 1 | 1 | 1 | 1 | 1 | 1 | 2 | 4 | 6 |

By using goal function biases of and $W_s=0.3$ and $W_a=0.7$, more bias is given to reducing the number of SAW readings. When run through the genetic optimization process, a set of weights is arrived at (see Table 2) which achieves a standard deviation of around 120-130 Hz, using only 5-6 interrogations.

TABLE 2 showing key iterations/generations, when using goal bias variables $W_s = 0.3$ and $W_a = 0.7$

| Generation number | Goal error | $\sigma_{f_{ave}}$ (Hz) | Number of readings N | Weights $w_m$ | | | | | | | | | |
|---|---|---|---|---|---|---|---|---|---|---|---|---|---|
| 0 | 0.969 | 93.8 Hz | 40 | 1 | 1 | 1 | 1 | 1 | 1 | 1 | 1 | 1 | 1 |
| 1 | 0.870 | 112.0 Hz | 31 | 1 | 1 | 2 | 1 | 1 | 2 | 1 | 1 | 1 | 2 |
| 2 | 0.734 | 124.5 Hz | 21 | 1 | 2 | 1 | 1 | 1 | 2 | 3 | 1 | 3 | 1 |
| 3 | 0.656 | 116.3 Hz | 18 | 1 | 2 | 1 | 1 | 1 | 1 | 2 | 2 | 4 | 1 |
| 4 | 0.602 | 118.1 Hz | 14 | 1 | 1 | 2 | 2 | 2 | 1 | 1 | 3 | 5 | 1 |
| 5 | 0.581 | 136.4 Hz | 10 | 1 | 1 | 2 | 1 | 2 | 3 | 2 | 5 | 6 | 1 |
| 6 | 0.561 | 136.2 Hz | 9 | 1 | 1 | 1 | 2 | 1 | 3 | 1 | 6 | 6 | 2 |
| 8 | 0.544 | 128.3 Hz | 9 | 1 | 1 | 1 | 1 | 1 | 3 | 1 | 5 | 7 | 2 |
| 11 | 0.539 | 115.3 Hz | 11 | 1 | 1 | 1 | 1 | 2 | 2 | 2 | 4 | 4 | 4 |
| 14 | 0.510 | 121.8 Hz | 8 | 1 | 1 | 1 | 1 | 1 | 1 | 2 | 4 | 6 | 7 |
| 15 | 0.505 | 120.1 Hz | 8 | 1 | 1 | 1 | 1 | 1 | 1 | 2 | 4 | 6 | 7 |
| 16 | 0.496 | 117.2 Hz | 8 | 1 | 1 | 1 | 1 | 1 | 1 | 2 | 4 | 6 | 7 |
| 18 | 0.493 | 118.3 Hz | 8 | 1 | 1 | 1 | 1 | 1 | 1 | 2 | 4 | 6 | 8 |
| 23 | 0.491 | 115.3 Hz | 8 | 1 | 1 | 1 | 1 | 1 | 1 | 2 | 4 | 6 | 7 |
| 30 | 0.490 | 132.5 Hz | 5 | 1 | 1 | 1 | 1 | 3 | 2 | 2 | 5 | 6 | 13 |
| 34 | 0.482 | 128.6 Hz | 6 | 1 | 1 | 1 | 1 | 3 | 1 | 2 | 4 | 6 | 13 |
| 44 | 0.478 | 123.5 Hz | 6 | 1 | 1 | 1 | 1 | 1 | 1 | 3 | 3 | 6 | 12 |

Although a generic set of weights will improve performance, for some installations a purpose developed set of weights may be preferable. In this situation measurements can be taken, and optimum weights arrived at using, for example, the simulation technique discussed above. However, an alternative technique would be for the TPMS installation to self-learn the optimum weights in situ using one of the techniques discussed above, on data it collects during its running operation.

2. Improved Interference Detection

Figure 4:
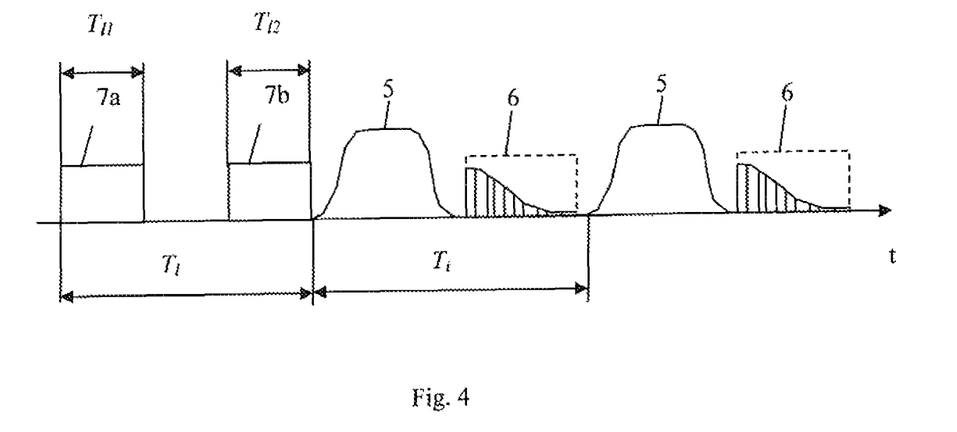
FIG. 4 illustrates an interference detection window in accordance with a preferred embodiment of the invention.

The new proposed interference detection algorithm is modified in comparison with prior art in the following way. Instead of taking samples of interference in a window 7 with the length $T_f=T_i$ as shown in FIG. 3, the samples are taken in two windows 7a and 7b with the length $T_{f1}=T_{f2}$ not exceeding the length of the SAW response sampling window 6 but covering a substantial portion of the interrogation pulse 5 as shown in FIG. 4. The time interval from the beginning of the window 7a to the end of the window 7b equals the interrogation period $T_i$. By using this arrangement the samples in the two windows will contain a substantial portion of the interfering interrogation pulses independently of the delay between the interference and the beginning of the interrogation cycle of the unit under consideration. The spectral analysis of the sampled interference signals is performed twice, which is a drawback. However the advantage is that the analysis is done by a regular routine used for the analysis of the SAW responses and the length of the sine and cosine look up table does not need to be increased.

The procedure of the analysis is as follows. First the spectral lines are calculated within the frequency range of interest and the maximum PSD value $P_1$ is found for the first window 7a. Then a similar calculation gives the maximum PSD value $P_2$ for the second window 7b. After that a combined PSD value $$P=(P_1^{1/2}+P_2^{1/2})^2 \quad (12)$$

is calculated and compared with a threshold to establish if the interrogation can start, or should be delayed until the particular interrogation channel is free. Alternatively, if interrogation of the particular resonator is not possible because of the interference, the system can try interrogating another resonator which may be unaffected by the narrowband interference.

If variation of the measured PSD value of the interference by 3 dB is acceptable, the combined PSD value can be calculated in a simpler way:

$$P=P_1+P_2 \quad (13)$$

Finally, in a highly dynamic environment there is a small probability that the interference not present at the start of the coherent accumulation cycle lasting for $N_cT_i=0.1\ldots 1.2$ ms will emerge in the middle of this cycle (e.g. the source of interference will suddenly get close enough to the interrogation antenna to become significant). In this case the frequency reading obtained on the basis of the accumulated SAW response would be spoiled. In order to detect this interference and disregard the reading, one more pair of the sampling windows similar to 7a and 7b can be positioned at the end of the coherent accumulation cycle.

The described improvement in the interference detection may be used in combination with the improved averaging method described above, or may be used separately, in order to provide an improvement in the immunity of the interrogation system to interference with or without the improved averaging. However, the improved interference detection can become particularly significant when using a simple and cheap digital signal processor which cannot easily perform the calculation of the spectrum of a long sampled signal. By using a split sampling window to detect interference as described above, the demands on the DSP are reduced.

It should be noted that the above described interrogation methods are not restricted to use in systems where the passive sensor is a SAW sensor, and are also not limited to use with resonant type sensors. If the sensor is based on a delay line, for example, the weighted averaging can be applied to measuring the phase delay or the group delay in the same way as described in relation to the measurement of frequency for a resonant sensor, and providing corresponding advantages. The same methods may also be used in systems where other parameters are measured, and it will be understood that the described methods provide particular advantages in passive sensing systems in which the random measurement errors depend on the magnitude of the received sensor response, and the magnitude varies during the time over which difference responses are averaged, in particular in wireless sensor systems.

Appendix I

Weights Minimizing the Standard Deviation of the Average Frequency

Assuming that the frequency readings fj are statistically independent the variance of the average frequency defined by Eq. (3) is $$\sigma_{fave}^2 = \frac{\sum_{j=1}^{N} w_j^2 \sigma_j^2}{\left(\sum_{j=1}^{N} w_j\right)^2}. \tag{A1}$$

The weights minimizing the standard deviation can be found by solving simultaneous equations $$\frac{\partial(\sigma_{fave}^2)}{\partial w_k} = 0, k = 1 \ldots N. \tag{A2}$$

The solutions are found after substituting (A1) into (A2):

$$w_k = \frac{1}{\sigma_k^2} \frac{\sum_{j=1}^{N} w_j^2 \sigma_j^2}{\sum_{j=1}^{N} w_j}. \tag{A3}$$

The second term in (A3) can be regarded as an arbitrary constant S giving the Eq. (4) for the optimum weights.

Appendix II

Variance of the Average Frequency Taking into Account Probability of Classes of Readings Let us suppose that, among the N readings taken to fill in the buffer, $N_m$ readings belong to the m-th class characterised by the range of PSD values of the SAW responses from $P_{m-1}$ to $P_m$ (see Table A1) The probability of the reading belonging to the m-th class is $p_m$.

TABLE A1

| Class number | PSD limits | Probability | Frequency readings | Average | St. dev. | Number of readings | Weight |
|---|---|---|---|---|---|---|---|
| 1 | $P_{th}$ to $P_1$ | $p_1$ | $f_1^{(1)}, f_2^{(1)}, \ldots f_{N1}^{(1)}$ | $f_0$ | $\sigma_1$ | $N_1$ | $w_1$ |
| 2 | $P_1$ to $P_2$ | $p_2$ | $f_1^{(2)}, f_2^{(2)}, \ldots f_{N2}^{(2)}$ | $f_0$ | $\sigma_2$ | $N_2$ | $w_2$ |
| m | $P_{m-1}$ to $P_m$ | $p_m$ | $f_1^{(m)}, f_2^{(m)}, \ldots f_{Nm}^{(m)}$ | $f_0$ | $\sigma_m$ | $N_m$ | $w_m$ |
| K | $P_{K-1}$ to $P_K$ | $p_K$ | $f_1^{(K)}, f_2^{(K)}, \ldots f_{NK}^{(K)}$ | $f_0$ | $\sigma_K$ | $N_K$ | $w_K$ |

The average frequency calculated according to Eqs. (3) and (6) can be rewritten in a different form:

$$f_{ave} = \frac{1}{N_a} \sum_{j=1}^{N} w_j f_j \tag{A4}$$

$$= \frac{1}{N_a}\left[w_1 \sum_{j1=1}^{N1} f_{j1}^{(1)} + w_2 \sum_{j2=1}^{N2} f_{j2}^{(2)} + \ldots + w_K \sum_{jK=1}^{NK} f_{jK}^{(K)}\right]$$

$$= \frac{1}{N_a} \sum_{m=1}^{K} w_m \sum_{jm=1}^{Nm} f_{jm}^{(m)}.$$

Then, bearing in mind that all the readings within each class and across all, classes can be regarded as statistically independent, the variance of the average frequency is $$\sigma_{fave}^2 = \langle (f_{ave} - f_0)^2 \rangle \tag{A5}$$

$$= \frac{1}{N_a^2} \left\langle \left[\sum_{m=1}^{K} w_m \sum_{jm=1}^{Nm} (f_{jm}^{(m)} - f_0)\right]^2 \right\rangle$$

-continued $$= \frac{1}{N_a^2} \langle w_1^2 N_1 \sigma_1^2 + w_2^2 N_2 \sigma_2^2 + \ldots + w_K^2 N_K \sigma_K^2 \rangle$$

$$= \frac{\langle N \rangle}{N_a^2} \sum_{m=1}^{K} w_m^2 \sigma_m^2 p_m. \quad 5$$

where < > means averaging over a number of attempts to calculate $f_{ave}$. Taking into account Eqs. (6) and (10) one can finally obtain Eq. (7) from Eq. (A5).

What is claimed is:

1. A method of wirelessly interrogating a sensing device comprising a plurality of passive sensors, to determine a measurement parameter, f, comprising the steps of:
   (1) interrogating each passive sensor using a predetermined transmission signal, detecting the passive sensor response and analyzing the passive sensor response to find its amplitude and an estimate of the measurement parameter;
   (2) repeating step (1) in order to obtain several estimates of the measurement parameter for each passive sensor; and
   (3) determining the average of the measurement parameters for each passive sensor, using a weighted average, in which the weightings depend on the amplitude of the passive sensor response, wherein the averaged measurement parameter $f_{ave}$ is given by $$f_{ave} = \frac{\sum_{j=1}^{N} w_j f_j}{\sum_{j=1}^{N} w_j},$$

where $f_j$ is an individual reading from a passive sensor, $w_j$ is the weight assigned to the reading $f_j$, and N is the number of readings being averaged.

2. The method according to claim 1, wherein the weightings depend on the maximum power spectral density of the passive sensor response.

3. The method according to claim 1, wherein the weightings $w_j$ are selected so as to minimize the standard deviation of $f_{ave}$ for a given value of N.

4. The method according to claim 3, wherein the weightings $w_j$ are selected according to the rule $w_j = S/\sigma_j^2$, where S is a constant, and $\sigma_j$ is the standard deviation of the measured parameter.

5. The method according to claim 1, wherein the measured parameters are stored in an averaging buffer, and the weightings $w_j$ are selected so as to minimize the time needed to fill the buffer while maintaining the standard deviation of the averaged measurement parameter.

6. The method according to claim 5, wherein the weightings are integer weightings where $w_j \geq 1$, and each measured value $f_j$ is written into the buffer $w_j$ times.

7. The method according to claim 5, wherein the range of power spectral density values of the sensor responses is divided into K classes, and the weightings for measurement parameter values in each class are selected by minimizing the goal function $$G = F_1(\sigma_{f_{ave}}) + CF_2(\langle N \rangle / N_a),$$

where $F_1(x)$ and $F_2(x)$ are monotonously increasing functions, C is a constant and the variance $\sigma_{f\,ave}^2$ of the averaged measurement parameter is given by $$\sigma_{f_{ave}}^2 = \frac{1}{N_a} \frac{\sum_{m=1}^{K} w_m^2 \sigma_m^2 p_m}{\sum_{m=1}^{K} w_m p_m},$$

where $w_m$ is the weighting for each of the K classes, $\sigma_m$ is its standard deviation and $p_m$ is the probability of a reading belonging to the class, $N_a$ is the length of the averaging buffer and <N> is the average number of readings required to fill in the buffer, given by $$\langle N \rangle = \frac{N_a}{\sum_{m=1}^{K} w_m p_m}.$$

8. The method according to claim 7, wherein the parameters governing the K classes are determined from test measurements performed for a given system of sensors.

9. The method according to claim 1, wherein the weightings are selected using a genetic optimization algorithm.

10. The method according to claim 1, wherein the determined measurement parameters are used to calculate pressure and temperature.

11. The method according to claim 1, wherein the passive sensors are SAW devices.

12. The method according claim 1, wherein the sensing device comprises a plurality of resonant devices, and the measurement parameter is the respective resonant frequency of each resonant device.

13. The method according to claim 12, wherein the resonant frequencies are estimated by means of spectral analysis of the data accumulated as a result of step (1).

14. The method according to claim 12, further comprising, prior to step (1), determining an optimal interrogation frequency for each resonant device, wherein in step (1) each resonant device is interrogated a plurality of times at its determined respective optimal interrogation frequency.

15. The method according to claim 12, wherein the spectral analysis in step (3) comprises performing discrete Fourier transforms, or is based on parametric signal modelling.

16. A method of wirelessly interrogating a sensing device comprising a plurality of passive sensors, to determine a measurement parameter, f, comprising the steps of:
   (1) interrogating each passive sensor during an interrogation period using a predetermined transmission signal comprising an interrogation pulse followed by a device sampling period for receiving the response from the device and detecting the passive sensor response and analyzing the passive sensor response to find its amplitude and an estimate of the measurement parameter, and detecting interference by
      detecting an interference signal during a detection period occurring at one of (i) the beginning of the interrogation period and (ii) both the beginning and end of the interrogation period, and
      comparing the power spectral density of the interference signal with a predetermined threshold level,
      wherein the duration of the detection periods corresponds to the length of the interrogation pulse plus the device sampling period, and comprises two discrete interference sampling periods during which respective interference signals are detected;

(2) repeating step (1) in order to obtain several estimates of the measurement parameter for each passive sensor by means of an analysis of the data accumulated as a result of step (1); and (3) determining the average of the measurement parameters derived from step (2) for each passive sensor, using a weighted average, in which the weightings depend on the amplitude of the passive sensor response, wherein the averaged measurement parameter $f_{ave}$ is given by $$f_{ave} = \frac{\sum_{j=1}^{N} w_j f_j}{\sum_{j=1}^{N} w_j},$$

where $f_j$ is an individual reading from a passive sensor, $w_j$ is the weight assigned to the reading $f_j$, and N is the number of readings being averaged.

17. The method according to claim 16, wherein the interference sampling periods are equal in length, and are located respectively at the beginning and end of the detection period.

18. The method according to claim 16, wherein the length of the interference sampling periods does not exceed the length of the device sampling period.

19. The method according to claim 16, wherein the length of the interference sampling periods corresponds to a substantial portion of the length of the interrogation pulse.

20. The method according to claim 16, wherein the maximum power spectral densities of the interference signals detected in each interference sampling period are combined to determine a combined power spectral density value.

21. The method according to claim 20, wherein the combined power spectral density P is determined by:
   $P=(P_1^{1/2}+P_2^{1/2})^2$, where $P_1$ and $P_2$ are the respective maximum power spectral density values for the two interference sampling periods.

22. The method according to claim 20, wherein the combined power spectral density P is determined by:

$P=P_1+P_2$.

23. The method according to claim 20, wherein, if the combined power spectral density exceeds a predetermined threshold level, the interrogation period is delayed or a different device or sensor is selected for interrogation.

24. The method according to claim 16, wherein a second pair of interference sampling periods are located at the end of the repeated interrogation cycle of step (1), to detect interference emerging during the interrogation cycle.

* * * * *